United States Patent
Jagadeesh et al.

(10) Patent No.: US 10,242,018 B2
(45) Date of Patent: Mar. 26, 2019

(54) PAGE ALLOCATIONS FOR ENCRYPTED FILES

(71) Applicant: International Business Machines Corporation, Armonk, NY (US)

(72) Inventors: Supriya Jagadeesh, Bangalore (IN); Puspanjali Kar, Bangalore (IN); Keerthi B. Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 15/131,070

(22) Filed: Apr. 18, 2016

(65) Prior Publication Data

US 2017/0300241 A1 Oct. 19, 2017

(51) Int. Cl.
*G06F 3/06* (2006.01)
*G06F 17/30* (2006.01)

(52) U.S. Cl.
CPC ........ *G06F 17/30138* (2013.01); *G06F 3/064* (2013.01); *G06F 3/0623* (2013.01); *G06F 3/0644* (2013.01); *G06F 3/0673* (2013.01)

(58) Field of Classification Search
CPC .... G06F 3/0613; G06F 3/0644; G06F 3/0647; G06F 3/0665; G06F 3/0683; G06F 17/30138
USPC .......................... 711/165, 170, 171, 172, 173
See application file for complete search history.

(56) References Cited

U.S. PATENT DOCUMENTS

| | | | | |
|---|---|---|---|---|
| 6,996,615 B1* | 2/2006 | McGuire | ................. | G06F 9/505 709/224 |
| 7,428,636 B1* | 9/2008 | Waldspurger | ......... | H04L 63/083 713/164 |
| 8,868,711 B2* | 10/2014 | Skjolsvold | ............ | G06F 9/5083 709/223 |
| 8,954,753 B2* | 2/2015 | Donie | ..................... | G06F 21/78 380/277 |
| 9,104,497 B2* | 8/2015 | Mortazavi | ............. | G06F 9/5083 |
| 2008/0022136 A1* | 1/2008 | Mattsson | ............ | G06F 21/6227 713/194 |

(Continued)

OTHER PUBLICATIONS

Villanueva, J.C., "Comparing Load Balancing Algorithms", Jun. 2015, hosted by Jscape, retrieved from <http://www.jscape.com/blog/load-balancing-algorithms>.*

(Continued)

*Primary Examiner* — Reginald G Bragdon
*Assistant Examiner* — Aaron D Ho
(74) *Attorney, Agent, or Firm* — Steven F. McDaniel; Arnold B. Bangali

(57) ABSTRACT

A computer-implemented method includes monitoring page allocations in a file system that includes encrypted files, determining if a page allocation request corresponds to an encrypted file, and balancing encrypted page allocations across a plurality of virtual memory pools in response to determining that the page allocation request corresponds to an encrypted file. In some embodiments, balancing encrypted page allocations across the plurality of virtual memory pools comprises determining a virtual memory pool having a lowest encrypted page count and allocating a page from the virtual memory pool having the lowest encrypted page count. A corresponding computer program product and computer system are also disclosed herein.

12 Claims, 5 Drawing Sheets

(56) References Cited

U.S. PATENT DOCUMENTS

| | | | | |
|---|---|---|---|---|
| 2010/0036956 A1* | 2/2010 | Nishikawa | ............... | G06F 9/505 709/226 |
| 2015/0169894 A1 | 6/2015 | Keohane et al. | | |
| 2016/0034721 A1* | 2/2016 | Moriguchi | ........... | G06F 21/6218 713/193 |
| 2017/0206175 A1* | 7/2017 | Sliwa | .................. | G06F 12/1408 |

OTHER PUBLICATIONS

Ellrod, C., "Load Balancing—Least Connections", Sep. 2010, hosted by Citrix, retrieved from <https://www.citrix.com/blogs/2010/09/02/load-balancing-least-connections/>.*

P. A. H. Peterson, "Cryptkeeper: Improving security with encrypted RAM," 2010 IEEE International Conference on Technologies for Homeland Security (HST), Waltham, MA, 2010, pp. 120-126. doi: 10.1109/THS.2010.5655081.*

Yixin Diao et al., "Comparative studies of load balancing with control and optimization techniques," Proceedings of the 2005, American Control Conference, 2005., 2005, pp. 1484-1490 vol. 2. doi: 10.1109/ACC.2005.1470175.*

S. C. Wang, K. Q. Yan, S. S. Wang and C. W. Chen, "A Three-Phases Scheduling in a Hierarchical Cloud Computing Network," 2011 Third International Conference on Communications and Mobile Computing, Qingdao, 2011, pp. 114-117.doi: 10.1109/CMC.2011.28 (Year: 2011).*

Disclosed Anonymously et al.,"Enhancement to VMM page replacement to incorporate EFS(encrypted file system) awareness", An IP.com Prior Art Database Technical Disclosure, IP.com No. 000216343, printed on Feb. 17, 2016, 13 pages.

\* cited by examiner

PAGE ALLOCATIONS FOR ENCRYPTED FILES

BACKGROUND OF THE INVENTION

The present invention relates generally to encrypted files and more particularly to virtual memory page allocations for encrypted files.

File systems that support file encryption typically encrypt virtual memory pages previous to swapping out pages from working memory to secondary storage and decrypt those pages when swapping in pages from secondary storage to working memory. Encryption and decryption of the stored data may be computationally expensive and increase the latency of virtual memory operations and thereby decrease the performance of a computing system.

SUMMARY

A computer-implemented method includes monitoring page allocations in a file system that includes encrypted files, determining if a page allocation request corresponds to an encrypted file, and balancing encrypted page allocations across a plurality of virtual memory pools in response to determining that the page allocation request corresponds to an encrypted file. In some embodiments, balancing encrypted page allocations across the plurality of virtual memory pools comprises determining a virtual memory pool having a lowest encrypted page count and allocating a page from the virtual memory pool having the lowest encrypted page count. A corresponding computer program product and computer system are also disclosed herein.

DETAILED DESCRIPTION

The embodiments disclosed herein recognize that swapping virtual memory pages for encrypted files is costly in that swapping a page from main memory to secondary storage requires encrypting the page and swapping a page from secondary storage to main memory requires decrypting the page. The embodiments disclosed herein also recognize that balancing the number of pages that correspond to encrypted files across multiple virtual memory pools may statistically reduce the rate of page swapping for encrypted files.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1:
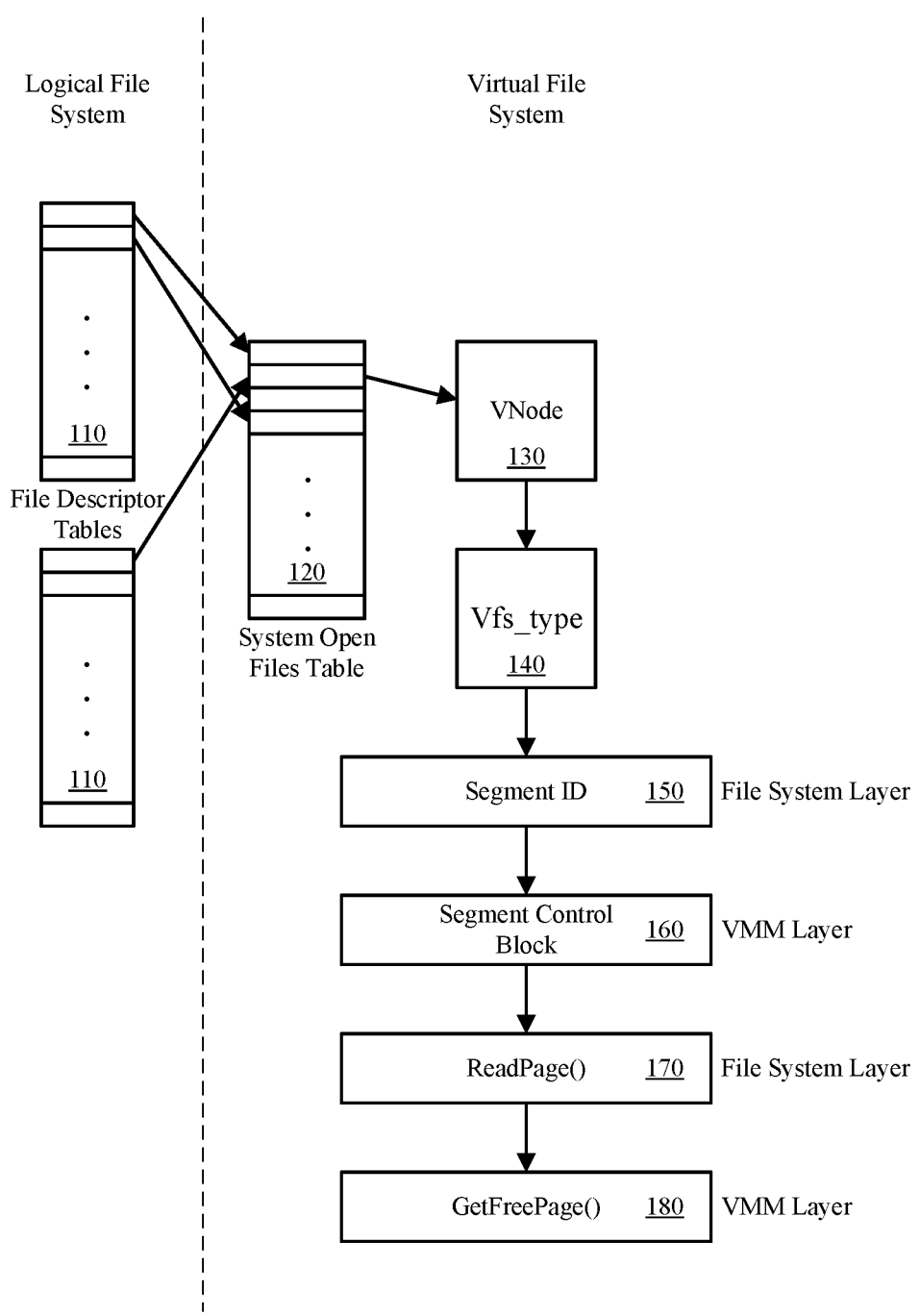
FIG. 1 is a block diagram depicting one example of a page allocation environment in accordance with at least one embodiment of the present invention.

FIG. 1 is a block diagram depicting one example of the present invention, in accordance with at least one embodiment. As depicted, FIG. 1 includes one of more file descriptor tables 110, one or more system file tables 120, a VNode table 130, a filetype table 140, a segment ID table 150, a segment control block 160, a readpage( ) function 170, and a getfreepage( ) function 180. FIG. 1 is one example of an environment in which the embodiments disclosed herein may be deployed.

The file descriptor tables 110 translate a file index or handle to a file pointer. The file descriptor tables 110 may also store flags for the files referenced therein. The system open file tables 120 contains entries for each open file. In the depicted embodiment, each file table entry tracks the current offset referenced by all read or write operations to the file as well as the open mode of the file.

The virtual node table 130 contains virtual node (vnode) information. Each vnode provides an interface between the logical file system and underlying file system implementation for an active file or directory within the operating system kernel. Each time a file is located, a vnode for that object is located or created.

The filetype table 140 contains the information about the virtual file system that corresponds to a file system in the operating system kernel. For example, such information may include the filesystem type (vfs_type) or name such as JFS, J2, NFS3, NFS4, STNFS [Note: One or more of the preceding filesystem names may be trademarked in various jurisdictions around the world].

The segment ID table 150 contains segment identifiers that indicate the file segment that contains the reference to actual files. The segment control block 160 contains control and configuration information for a virtual memory segment such as the number of virtual pages in the memory segment and whether the memory segment corresponds to an encrypted file.

The readpage( ) function 170 is called when a page is to be swapped in from secondary storage. The getfreepage( ) function 180 retrieves (i.e., allocates) a free page from a virtual memory pool. The embodiments disclosed herein may modify the getfreepage( ) function to balance the allocation of encrypted pages across some or all of the virtual memory pools associated with the environment 100 or the like.

Figure 2:
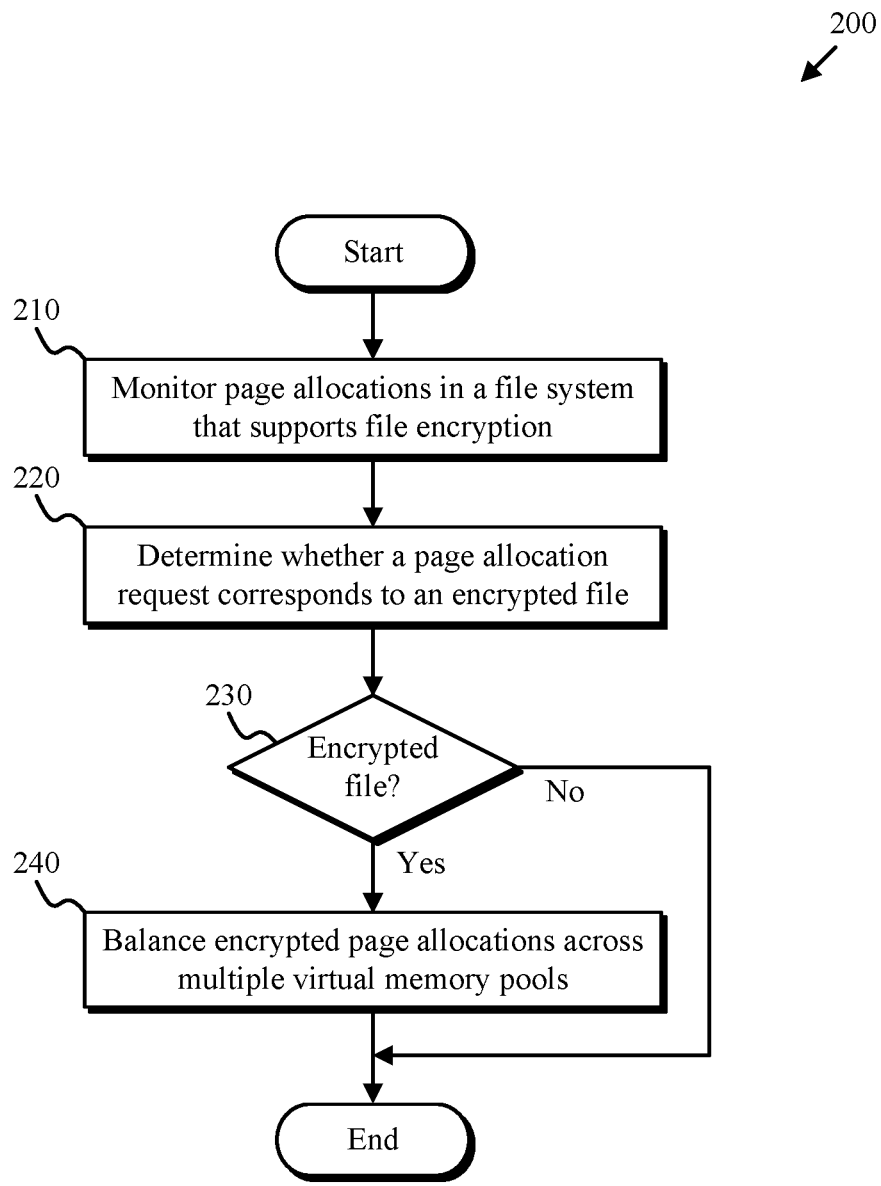
FIG. 2 is a flowchart depicting one example of page allocation method in accordance with at least one embodiment of the present invention.

FIG. 2 is a flowchart depicting one example of page allocation method 200 in accordance with at least one embodiment of the present invention. As depicted, the page allocation method 200 includes monitoring (210) page allocations, determining (220) whether a page allocation corresponds to an encrypted file, branching (230), and balancing (240) encrypted page allocations. The page allocation method 200 may be conducted in accordance with the page allocation environment 100 or the like.

Monitoring (210) page allocations may include monitoring page allocations in a file system that supports file encryption. In some embodiments, an encrypted page count is tracked for each memory pool and a lowest encrypted page count is also tracked for each affinity domain.

Determining (220) whether a page allocation corresponds to an encrypted file may include testing a flag or an information field associated with the page that is to be allocated, or the file for which the page is being allocated, to determine whether the page allocation corresponds to an encrypted file. In some embodiments, a file handle or some other type of file identifier is passed into a page allocation function associated with a file system. In those embodiments, a segment ID for the identified file may be determined and used to access a segment control block corresponding to the segment ID. The segment control block may indicate whether the file is an encrypted file.

Branching (230) may include exiting the method 200 if the page allocation does not correspond to an encrypted file and continuing to the balancing operation 240 if the page allocation corresponds to an encrypted file. Balancing (240) encrypted page allocations may include allocating an encrypted page to a virtual memory pool that has a low number of encrypted pages relative to the average number of encrypted pages for all of the virtual memory pools. In some embodiments, an encrypted page is allocated to a virtual memory pool with the lowest encrypted page count.

Figure 3:
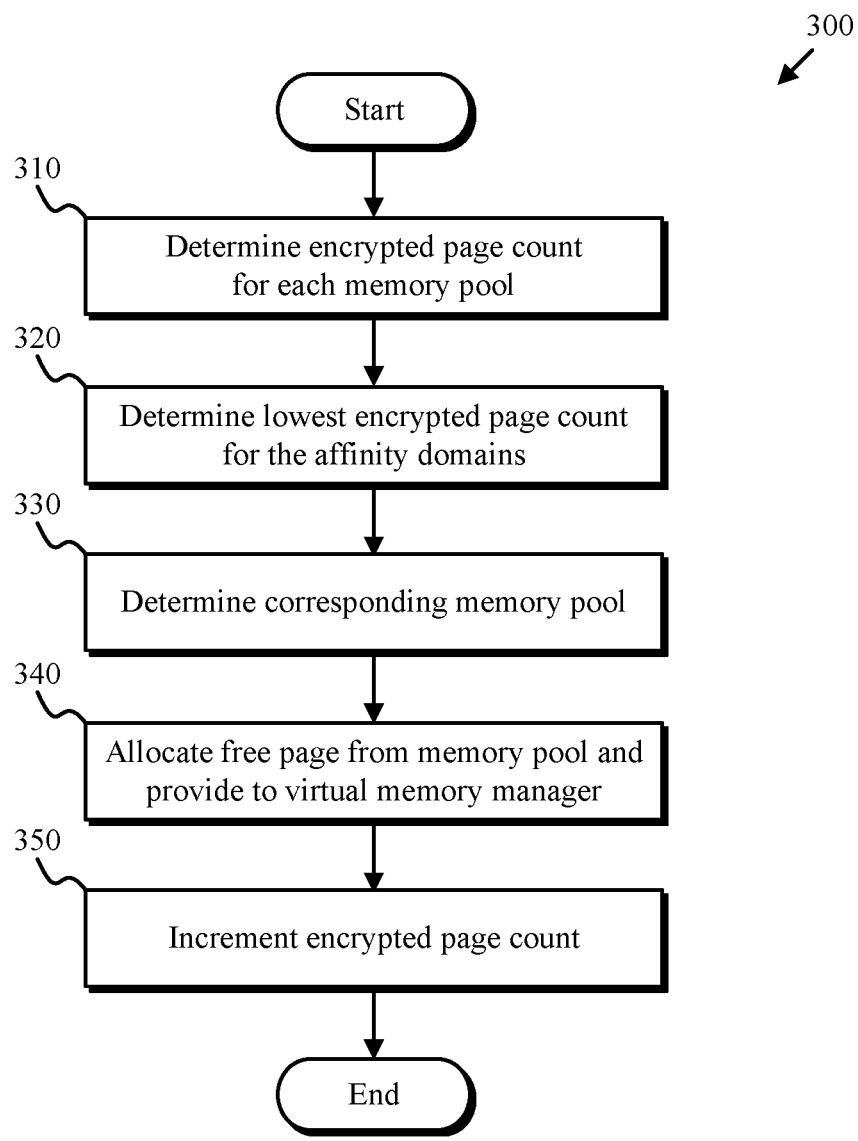
FIG. 3 is a flowchart depicting one example of an encrypted page balancing method in accordance with at least one embodiment of the present invention.

FIG. 3 is a flowchart depicting one example of an encrypted page balancing method 300 in accordance with at least one embodiment of the present invention. As depicted, the encrypted page balancing method 300 includes determining (310) encrypted page counts, determining (320) a lowest encrypted page count, determining (330) a corresponding memory pool, allocating (340) a free page, and incrementing (350) the encrypted page count. The encrypted page balancing method 300 may be conducted in conjunction with the balancing operation 240 depicted in FIG. 3.

Determining (310) encrypted page counts may include determining the encrypted page count for each memory pool and/or each affinity domain. Determining (320) a lowest encrypted page count may include determining the lowest encrypted page count for all of the memory pools and/or affinity domains. Determining (330) a corresponding memory pool may include determining a memory pool that has the lowest encrypted page count.

Allocating (340) a free page may include allocating a page from the memory pool that has the lowest encrypted page count. Incrementing (350) the encrypted page count may include incrementing the encrypted page count for the memory pool. In some embodiments, a lowest encrypted page count for the affinity domain that corresponds to the memory pool is updated if no other memory pools in that affinity domain have an encrypted page count that is equal to the lowest encrypted page count.

Figure 4:
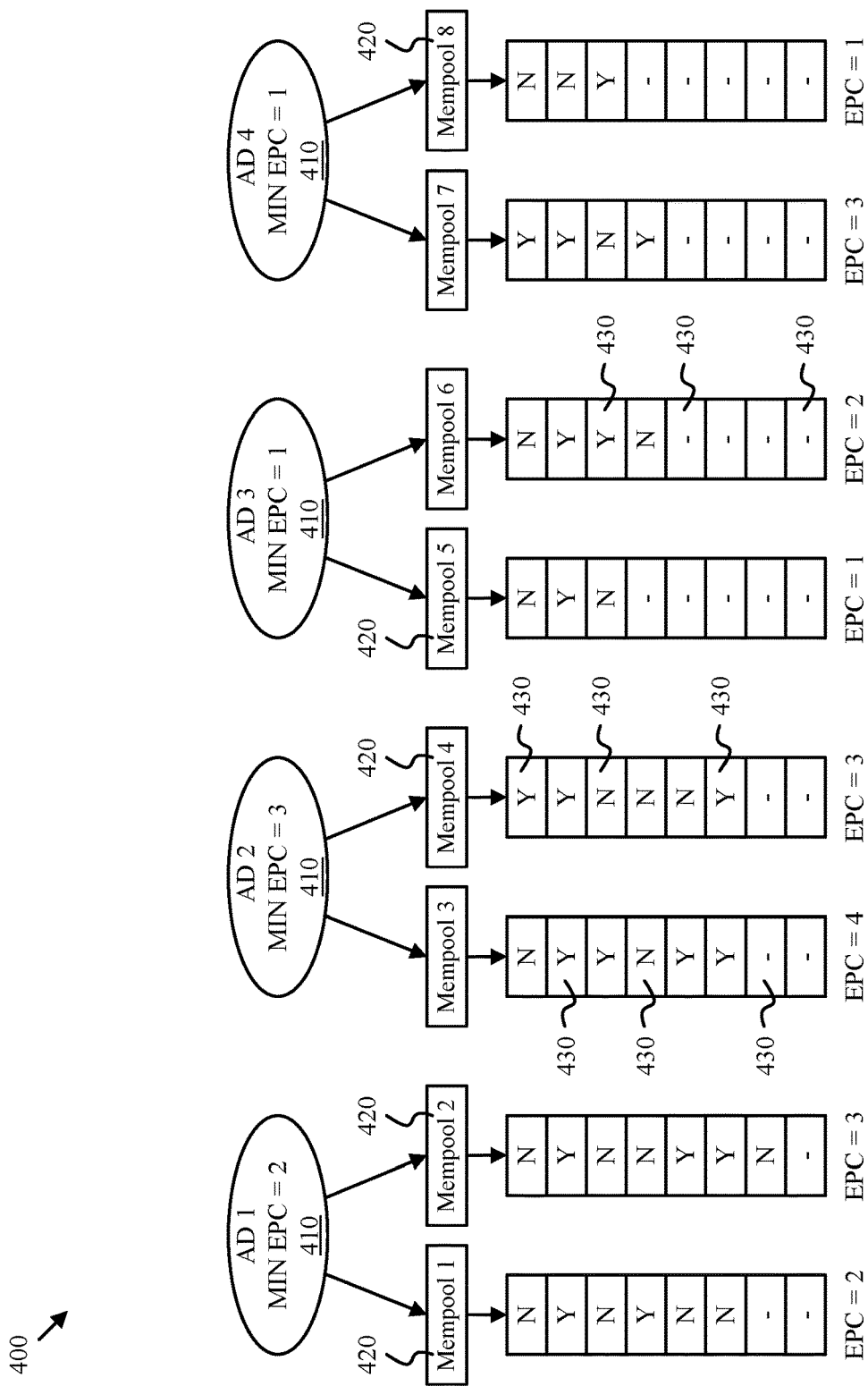
FIG. 4 is a block diagram depicting one example of encrypted page balancing in accordance with at least one embodiment of the present invention.

FIG. 4 is a block diagram depicting one example of encrypted page balancing 400 in accordance with at least one embodiment of the present invention. The resources of a computing system, such as memory and processors (not shown), may be partitioned into multiple affinity domains 410 (e.g., 410A-410D in the depicted embodiment). For example, each affinity domain 410, labeled AD1, AD2, AD3, and AD4, respectively, may include computing resources that are locally accessible to each other. In the depicted example, each affinity domain 410 includes two virtual memory pools 420. Each virtual memory pool includes a pool of memory pages that can be allocated to files. In the depicted example, a page status indicator 430 indicates whether the page is unallocated (indicated by a '–' character) and whether the page corresponds to an encrypted file (indicated by a 'Y' character) or not (indicated by a 'N' character).

In the depicted example, an encrypted page count ('EPC') is tracked for each memory pool and a minimum encrypted page count ('MIN EPC') is tracked for each affinity domain. Tracking the encrypted page counts for the memory pools 420 and the minimum encrypted page counts for the affinity domains enables efficient determination of the virtual memory pool with the lowest encrypted page count. In the depicted example, the two affinity domains on the right half of the figure both have memory pools with an encrypted page count of '1' which is the lowest encrypted page count for all of the virtual memory pools. Consequently, a page allocation request corresponding to an encrypted file may result in the allocation of a page from one of those two virtual memory pools.

One of skill in the art will appreciate the simplicity of the depicted example. The depicted example and other embodiments disclosed herein balance the number of pages that correspond to encrypted files across multiple virtual memory pools. One of skill in the art will also appreciate that many variations of the disclosed embodiments, as well as other embodiments, may be implemented that fit within the scope of the claimed invention.

Figure 5:
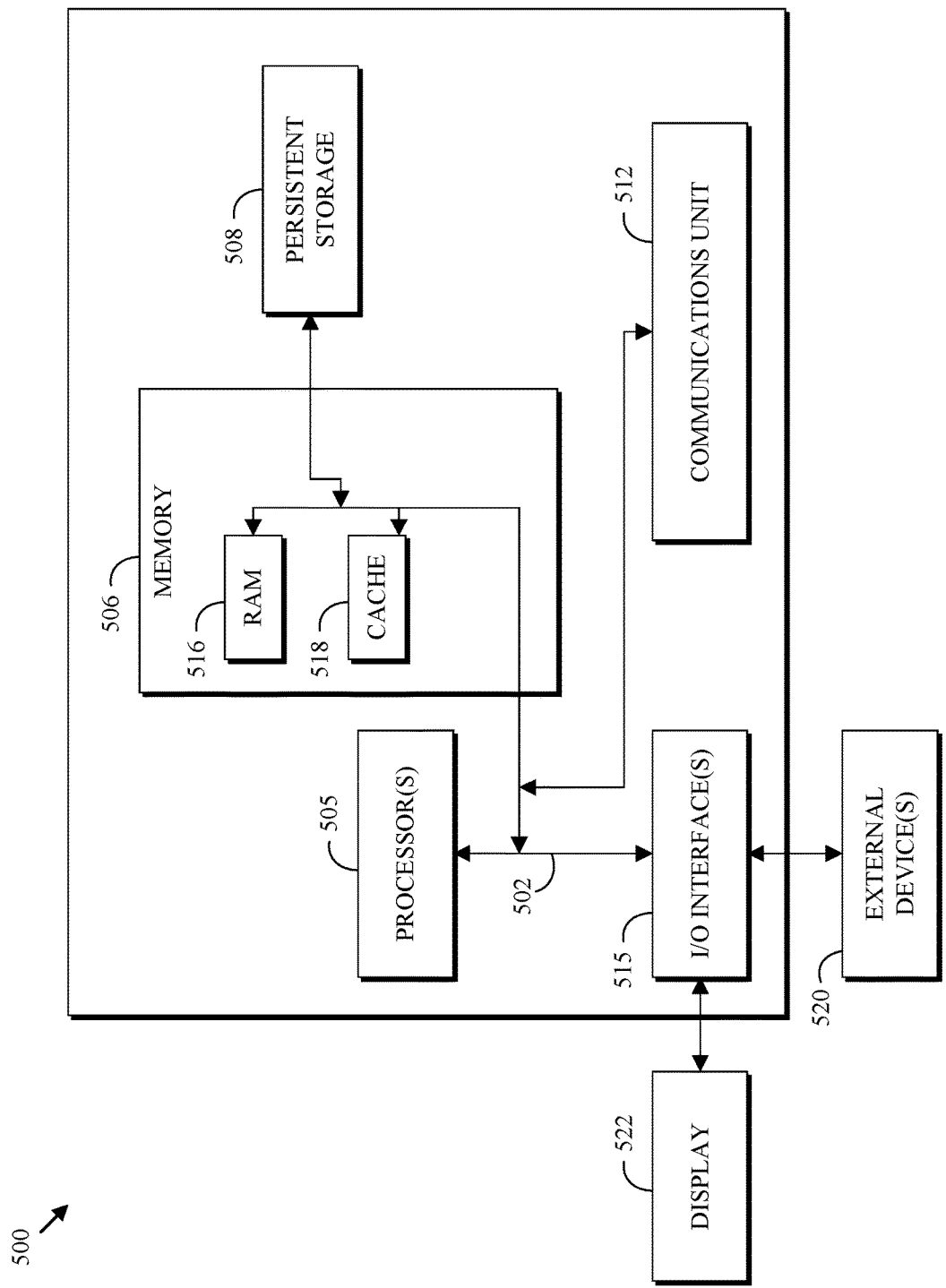
FIG. 5 is a block diagram depicting one example of a computing apparatus (i.e., computer) suitable for executing the methods disclosed herein.

FIG. 5 is a block diagram depicting one example of a computing apparatus (i.e., computer 500) suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

One of skill in the art will appreciate that the above disclosed embodiments may be adapted for a variety of environments and applications. Furthermore, the programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, executed by one or more processors, the method comprising:
    monitoring page allocations in a file system that supports file encryption;
    determining if a page allocation request corresponds to an encrypted file, wherein determining if the page allocation request corresponds to an encrypted file includes passing a file handle into a page allocation function associated with the file system, determining a segment identifier for a file that corresponds to the page allocation request, and accessing a segment control block that corresponds to the segment identifier to determine whether the file is encrypted; and
    balancing encrypted page allocations across a plurality of virtual memory pools in response to determining that the page allocation request corresponds to an encrypted file, wherein each virtual memory pool of the plurality of virtual memory pools corresponds to an affinity domain of a plurality of affinity domains, wherein each affinity domain of the plurality of affinity domains includes a respective plurality of virtual memory pools, and wherein each affinity domain of the plurality of affinity domains maintains a track of a lowest encrypted page count for the respective memory pools within the respective affinity domain.

2. The method of claim 1, wherein balancing encrypted page allocations reduces the number of encryption and decryption operations associated with page allocations.

3. The method of claim 1, further comprising, for an affinity domain of the plurality of affinity domains, allocating a page from a virtual memory pool having the lowest encrypted page count for the respective memory pools within the respective affinity domain in response to determining the virtual memory pool having the lowest encrypted page count for the respective memory pools within the respective affinity domain.

4. The method of claim 1, further comprising, for an affinity domain of the plurality of affinity domains, incrementing the encrypted page count for a memory pool having the lowest encrypted page count for the respective memory pools within the respective affinity domain.

5. The method of claim 1, further comprising tracking an encrypted page count for each virtual memory pool of the plurality of virtual memory pools.

6. The method of claim 1 further comprising accessing an encryption indicator for the file within the segment control block.

7. A computer system comprising:
    one or more computers;
    one or more computer readable storage media and program instructions stored on the one or more computer readable storage media for execution by at least one of the computers, the program instructions comprising instructions executable by a computer to perform:
    monitoring page allocations in a file system that supports file encryption;
    determining if a page allocation request corresponds to an encrypted file, wherein determining if the page allocation request corresponds to an encrypted file includes passing a file handle into a page allocation function associated with the file system, determining a segment identifier for a file that corresponds to the page allocation request, and accessing a segment control block that corresponds to the segment identifier to determine whether the file is encrypted; and
    balancing encrypted page allocations across a plurality of virtual memory pools in response to determining that the page allocation request corresponds to an encrypted file, wherein each virtual memory pool of the plurality of virtual memory pools corresponds to an affinity domain of a plurality of affinity domains, wherein each affinity domain of the plurality of affinity domains includes a respective plurality of virtual memory pools, and wherein each affinity domain of the plurality of affinity domains maintains a track of a lowest encrypted page count for the respective memory pools within the respective affinity domain.

8. The computer system of claim 7, wherein balancing encrypted page allocations reduces the number of encryption and decryption operations associated with page allocations.

9. The computer system of claim 7, wherein the program instructions further comprise, for an affinity domain of the plurality of affinity domains, allocating a page from a virtual memory pool having the lowest encrypted page count for the respective memory pools within the respective affinity domain in response to determining the virtual memory pool having the lowest encrypted page count for the respective memory pools within the respective affinity domain.

10. The computer system of claim 7, wherein the program instructions further comprise for an affinity domain of the plurality of affinity domains, incrementing the encrypted page count for a memory pool having the lowest encrypted page count for the respective memory pools within the respective affinity domain.

11. The computer system of claim 7, wherein the program instructions further comprise instructions to perform: tracking an encrypted page count for each virtual memory pool of the plurality of virtual memory pools.

12. A computer program product comprising:
one or more computer readable storage media and program instructions stored on the one or more computer readable storage media, the program instructions comprising instructions executable by a computer to perform:
monitoring page allocations in a file system that supports file encryption;
determining if a page allocation request corresponds to an encrypted file, wherein determining if the page allocation request corresponds to an encrypted file includes passing a file handle into a page allocation function associated with the file system, determining a segment identifier for a file that corresponds to the page allocation request, and accessing a segment control block that corresponds to the segment identifier to determine whether the file is encrypted; and
balancing encrypted page allocations across a plurality of virtual memory pools in response to determining that the page allocation request corresponds to an encrypted file, wherein each virtual memory pool of the plurality of virtual memory pools corresponds to an affinity domain of a plurality of affinity domains, wherein each affinity domain of the plurality of affinity domains includes a respective plurality of virtual memory pools, and wherein each affinity domain of the plurality of affinity domains maintains a track of a lowest encrypted page count for the respective memory pools within the respective affinity domain.

* * * * *